Figure 1:
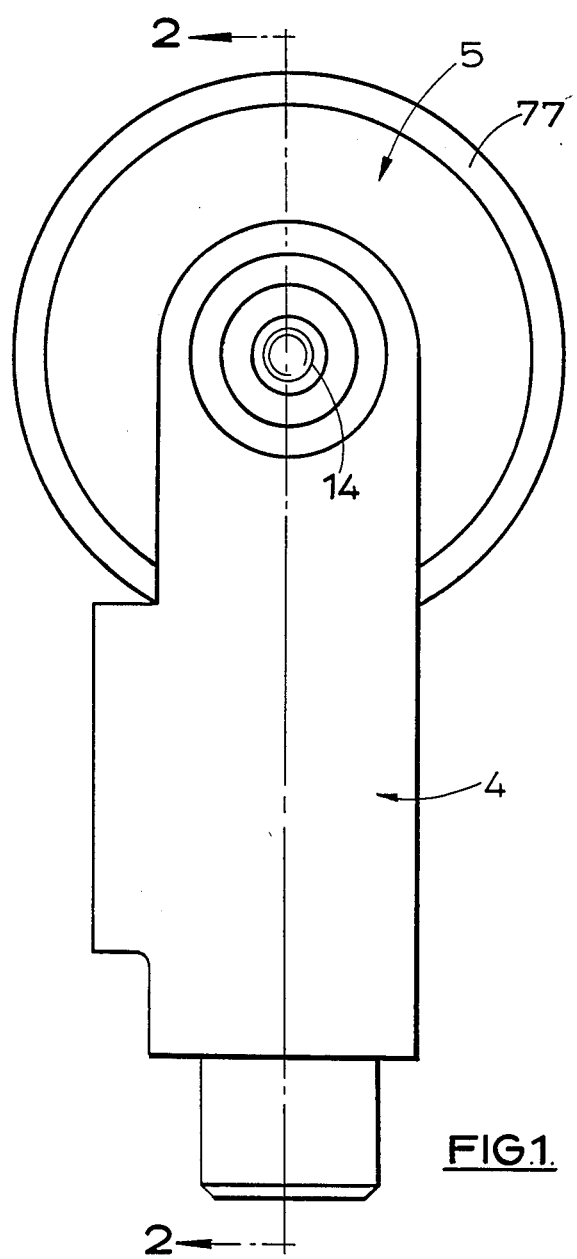

United States Patent [19]

Farr

[11] Patent Number: 4,730,705

[45] Date of Patent: Mar. 15, 1988

[54] SKID-SENSING MEANS FOR VEHICLE HYDRAULIC ANTI-SKID BRAKING SYSTEMS

[75] Inventor: Glyn P. R. Farr, Warwickshire, England

[73] Assignee: Lucas Industries Public Limited Company, England

[21] Appl. No.: 837,000

[22] Filed: Mar. 6, 1986

[30] Foreign Application Priority Data

Mar. 15, 1985 [GB] United Kingdom ............... 8506706

[51] Int. Cl.$^4$ .............................................. B60T 8/16
[52] U.S. Cl. ................................. 188/181 A; 303/116
[58] Field of Search ............... 188/180, 181 A, 181 R; 303/112, 113, 116, 117

[56] References Cited

U.S. PATENT DOCUMENTS

| | | | |
|---|---|---|---|
| 2,656,017 | 10/1953 | Trevaskis | 188/181 A |
| 3,433,535 | 3/1969 | Horvath | 188/181 A |
| 4,353,440 | 10/1982 | Farr | 188/181 A |

FOREIGN PATENT DOCUMENTS

| | | | |
|---|---|---|---|
| 79200 | 5/1983 | European Pat. Off. | 188/181 A |
| 2029914 | 3/1980 | United Kingdom | 188/181 A |

Primary Examiner—Duane A. Reger
Assistant Examiner—Matthew C. Graham
Attorney, Agent, or Firm—Laff, Whitesel, Conte & Saret

[57] ABSTRACT

A flywheel mechanism acts on a dump valve through a lever assembly. The lever assembly comprises a lever which carries an arm at an intermediate point in its length and the arm projects through a seal into a chamber in a casing to co-operate with a valve member of the dump valve which is engageable with a seating. The arm is pivotally connected to the casing by a pivot pin of which the axis is offset from the main axis of the arm in a direction towards the flywheel mechanism. Brake pressure acts on the arm to move it angularly about the pin in a direction to enhance the closing force of the dump valve. Offsetting the pin ensures that the flywheel mechanism has to generate a relatively higher torque on good surfaces when relatively high brake pressures are present before the dump valve will open, than on poor surfaces when the brake pressures are relatively low.

8 Claims, 2 Drawing Figures

SKID-SENSING MEANS FOR VEHICLE HYDRAULIC ANTI-SKID BRAKING SYSTEMS

This invention relates to improvements in skid-sensing means for vehicle hydraulic anti-skid braking systems of the kind in which a flywheel assembly in a housing is mounted on and driven from a shaft which in turn is driven from a wheel to be braked by a brake adapted to be applied hydraulically from a source of fluid under pressure, suitably an hydraulic master cylinder, and the flywheel assembly comprises a flywheel member, a reaction member, and a ball and ramp mechanism co-operating with the two members and so constructed and arranged that relative angular movement between the members which occurs when the deceleration of the braked wheel exceeds a predetermined value is accompanied by relative axial movement therebetween into an expanded condition in order to open a dump valve to relieve the pressure applied to the brake, and the flywheel assembly is driven from the shaft through a clutch which is arranged to slip at a predetermined threshold torque so that the two members can continue to rotate together, or "overrun", in the expanded condition with respect to the shaft to maintain the dump valve in the open condition, at least until the wheel has recovered a predetermined rotational speed.

In some known skid-sensing means of the kind set forth the relative axial movement between the two members is transmitted to the dump valve through a lever assembly, and operation of the dump valve is also operative to initiate operation of an isolating valve between the master cylinder and the brake to isolate the master cylinder from the brake at or slightly before the dump valve is opened to relieve the pressure applied to the brake.

In some known constructions, the size of the flywheel assembly is determined by the force required to open the dump valve. This force should not exceed substantially 20% of the force available at the flywheel assembly otherwise the flywheel assembly wil not be able to actuate the dump valve smoothly, or provide a good speed reference, whilst over-running against the clutch with the ball and ramp mechanism in the expanded condition.

Normally, in an inoperative position, the dump valve is urged by the force in a spring into a closed position in opposition to the pressure applied to the brake with a valve member urged into engagement with a valve seating. The strength of the spring must therefore be chosen to equal the highest anticipated brake pressure, for example 150 bar, which acts over the area of the valve orifice, specifically over the effective area of that part of the valve member which co-operates with the valve seating. The area of the valve orifice is determined by the desired dump rate for that braking system in which the dump valve is incorporated.

At high pressures the dump valve is easier to open than at low pressures because the force generated by the flywheel assembly has to overcome the difference in the force between the force of the spring and the force of the brake pressure acting over the area of the valve orifice.

The threshold of the flywheel assembly therefore decreases with road surface friction, or brake pressure, which is a disadvantage since the assembly will be less sensitive at the lower pressures which are likely to cause skid conditions when the vehicle is travelling on surfaces of low co-efficients of friction ($\mu$), and more sensitive at high pressures likely to be experienced on surfaces of high $\mu$.

If the dump valve is arranged such that the brake pressure acts to hold it closed, the spring need only exert a minimal force on the valve in a closing direction. Also the force generated by flywheel assembly to open the dump valve at high brake pressures will be higher than that at low brake pressures.

Attempts to produce a dump valve which is urged into a closed position by brake pressure have resulted in the area of the valve orifice having to be increased substantially in order to accommodate a thrust member or probe which projects through the valve orifice and co-operates with the valve member to urge it away from the seating. Therefore, although the force in the spring has been reduced and the average brake pressure to be overcome is now substantially 75 bar, since the area of the valve orifice has been increased to accommodate the thrust member or probe and at the same time maintain the desired dump rate, the force required to open the valve is substantially the same as for constructions in which a spring acts to close the dump valve against the force due to brake pressure.

According to our invention, in skid-sensing means of the kind set forth the dump valve comprises a valve seating, and a valve member for engagement with the seating, and the flywheel assembly acts on the valve member through a lever assembly comprising a lever which is angularly movable about a fixed pivot in the housing in response to relative axial movement between the members of the flywheel assembly, and the lever is provided with an arm which projects at its inner end into a chamber in the housing through a fluid-tight seal and acts to co-operate with the valve member to urge it away from the seating against a force due to fluid brake-pressure in the chamber which acts normally to urge the valve member into engagement with the seating in a closed position of the dump valve.

We are therefore able to open the dump valve against the force due to fluid-brake pressure without in any way obstructing a valve orifice defined by the area surrounded by the valve seating. In consequence the area of the valve orifice can be chosen to provide a chosen dump rate, irrespective of any other considerations, and the size of the flywheel assembly can be relatively reduced since it is necessary only for it to be of a size sufficient to provide opening forces for the dump valve.

To initiate closure of the dump valve, the arm is urged by a spring in a direction to bias the valve member into engagement with the seating. Such a spring can be relatively light since the force which it exerts has only to ensure that the closing force is slightly greater than the slight friction forces of the lever pivot.

Preferably the inner end of the arm which projects into the chamber has a pressure-responsive face responsive to pressure in the chamber, and the fixed pivot is so positioned that the pressure acting on the pressure-responsive face applies a turning moment to the lever assembly to move it in such a direction as to urge the valve member into engagement with the seating.

This means that when the brake pressure is relatively high with the vehicle travelling over a surface of relatively high $\mu$, the flywheel assembly must generate a relatively higher torque before the dump valve will open than the torque required to open the dump valve when the brake pressure is relatively low with the vehicle travelling over a surface of relatively low $\mu$.

Conveniently the arm has a generally cylindrical portion which extends through the seal, and the fixed pivot comprises a transverse pivot pin which pivotally connects the cylindrical portion to the housing and of which the axis is spaced from the longitudinal axis of the cylindrical portion to the side remote from the dump valve.

The lever is prferably pivotally connected to the housing at an intermediate point in its length with the light spring acting on one end of the lever to urge the opposite end towards the flywheel assembly.

Preferably the lever assembly is also arranged to operate an isolating valve between the master cylinder and the brake. This ensures that the isolating valve cannot be closed to isolate the master cylinder from the brake unless the arm is operated. Thus any leakage of fluid past the dump valve when closed will not cause premature closure of the isolating valve or otherwise affect it in any way whatsoever.

Conveniently the arm acts normally to hold the isolating valve in an open position when the dump valve is closed, and a lost-motion connection is provided between the arm and the valve member of the dump valve to ensure that the dump valve cannot be opened before the isolating valve has closed.

The isolating valve may comprise a head at one of a stem which projects through a longitudinal passage in a spool of a flow-control regulator valve and the opposite end of the stem is engageable with the arm, normally the head being spaced from a seating on the spool against the force in a return spring.

Figure 2:
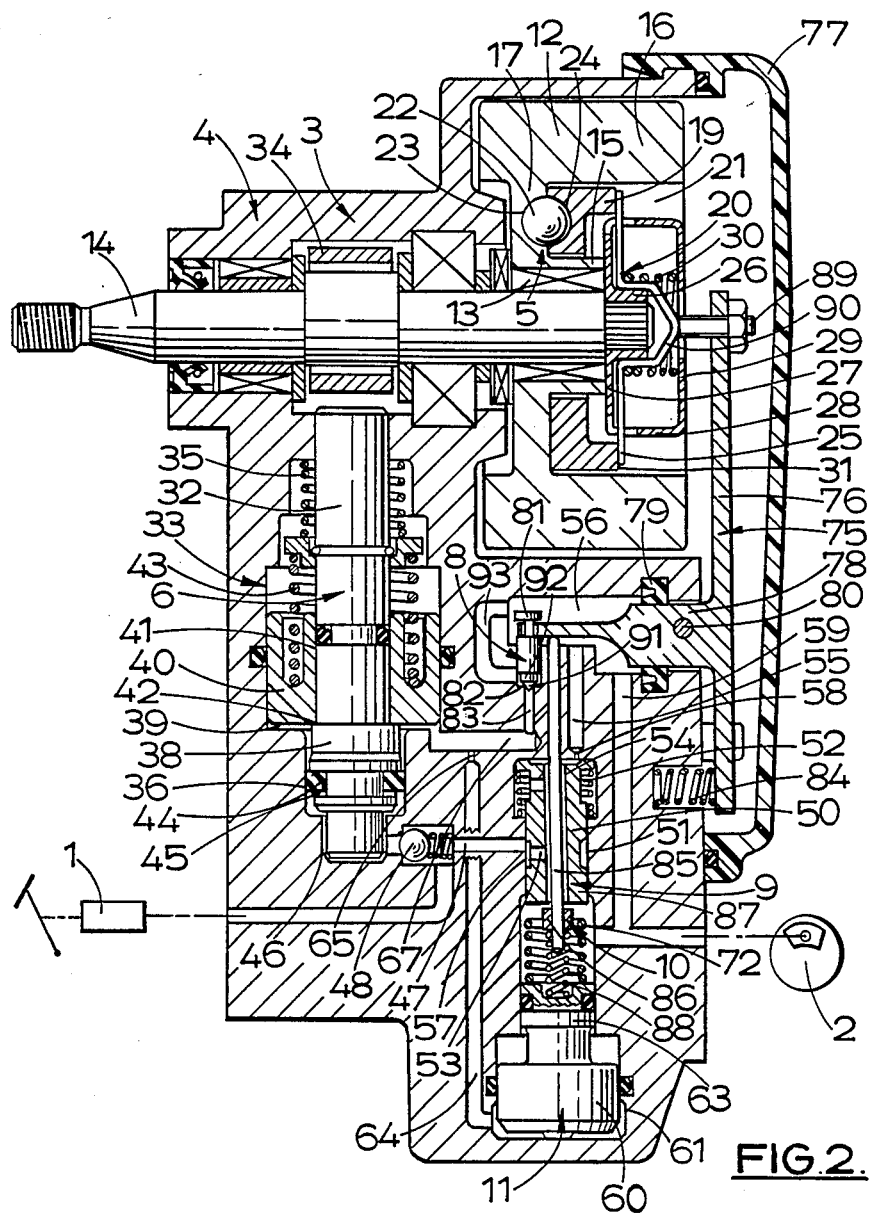

One embodiment of our invention is illustrated in the accompanying drawings in which:

FIG. 1 is a end view of a modulator assembly for an anti-skid hydraulic braking system for a vehicle; and FIG. 2 is a section on the line 2—2 of FIG. 1 with the modulator assembly incorporated in the layout of a braking system.

The anti-skid braking system illustrated in the drawings comprises a pedal-operated hydraulic master cylinder 1 for operating a wheel brake 2, and a modulator assembly 3.

The modulator assembly 3 comprises a casing 4 in which is incorporated a flywheel mechanism 5, a pump 6, a dump valve 8, a flow-control regulator 9, an isolating valve 10, and a time-delay piston 11.

The flywheel mechanism 5 comprises a flywheel 12 which is rotatably mounted on a bearing 13 at the inner end of a shaft 14 which extends transversely through the casing 4 and is driven from a wheel to be braked by the brake 2, suitably through an endless belt. The flywheel 12 comprises a central hub 15 from which an outer annular rim 16 is carried by means of a radial web 17. The hub 15 and the rim 16 both project axially outwards from the web 17 by smaller and greater distances respectively, and a reaction member 19 of annular outline and a spring-loaded clutch assembly 20 are both housed within a space 21 defined between the rim 16, the hub 15, and the free end of the shaft 14.

The reaction member 19 surrounds the hub 15 and balls 22, suitably three in number, are housed in angularly spaced recesses 23, 24 of complementary outline in adjacent faces of the flywheel 12 and the reaction member 19. The engagement of the balls 22 in the recesses 23 and 24 acts to centre the reaction member 19, holding it in a spaced relationship at its inner and outer edges with respect to the hub 15 and the rim 16. The edges of the recesses 23, 24 define ramps up which the balls 22 are adapted to ride upon relative rotation between the flywheel 12 and the reaction member 1, with the reaction member 19 moving substantially simultaneously axially away from the flywheel 12.

The clutch 20 comprises a member 25 of generally top-hat section which is mounted for axial sliding movement on a nut 26 screwed onto the free end of the shaft 14. The nut 26 has an integral radial flange 27 contiguous at its outer end with a cylindrical skirt 28 of which the free end is peened over or otherwise formed into an inturned flange 29 defining an abutment for one end of a compression spring 30, of which the inner end acts on the clutch member 25 to urge it into frictional engagement with a clutch face 31 on the reaction member 19, in turn urging the reaction member 19 towards the flywheel 12 with the balls 22 located at the bases of their recesses 23, 24.

The pump 6 comprises a plunger 32 which is housed in a longitudinal bore 33 of stepped outline in the casing 4. At its inner end of the plunger 32 works through the portion of the bore 33 which is of smallest diameter and is held away from an eccentric drive portion 34 on the shaft 14 by a compression spring 35. An enlarged head 38 carried by the plunger 32 works in outer end 36 of the bore 33 which is of greatest diameter and which is closed.

An expander chamber 39 constituting a fluid reservoir for the pump 6 is defined in the bore 33 between the head 38 and an expander piston 40 which works in the bore 33 and has a central bore 41 through which the plunger 32 works. The expander piston 40 is normally urged into engagement with a shoulder 42 on the plunger 32 by means of a compression spring 43 which is stronger than the spring 35. In this position, the effective volume of the reservoir 39 is at a minimum.

A seal 44 housed in a groove 45 in the head 38 defines an inlet valve through which fluid is drawn from the chamber 39 during an induction stroke and into a pumping chamber 46 in the bore 37. Upon movement of the plunger 32 in the opposite direction, during a power stroke, the inlet valve closes with the seal 44 sealing against the wall at the inner end of the groove 45 so that fluid is discharged from the chamber 46 to a passage 47 through a one-way outlet valve 48. The passage 47 is disposed between the master cylinder 1 and the flow control regulator valve 9.

The flow control regulator valve 9 comprises a spool 50 which works in a bore 51 in the casing 4. In a position of maximum flow the spool 50 is urged inwardly by a compression spring 52, into abutment with a face at the inner end of the bore 51. A radial passage 53 in the spool 50 is in free communication with the passage 47 to connect it to a central throughbore 54 in the spool 50 leading to the brake 2, both through the isolating valve 10, and through a longitudinal passage 55 incorporating an orifice 58 of fixed area, a chamber 56, and a longitudinal passage 59.

In this position a variable orifice defined by the end of the passage 47 and an annular recess 57 at the outer end of the passage 53 is at its greatest area. A wall defining the upper edge of the recess 57 defines a metering edge.

The time-delay piston 11 is of stepped outline having an outer portion 60 of greater area working in a blind bore 61 and an inner portion 63 working in the bore 51 itself. The blind bore 61 is connected to the expansion chamber or reservoir 39 through a passage 64 including a restricted orifice 65, and a passage 67 leading to the chamber 39 itself.

A compression spring 72 urges the piston 11 outwardly into abutment with the closed outer end of the bore 61.

The dump valve 8 and the isolating valve 10 are operated by a lever assembly 75 with which the flywheel mechanism 5 is adapted to co-operate. As illustrated, an operating lever 76 in the form of an elongate strip is mounted on the exterior of the casing 4, being enclosed within a cover 77 which also encloses the flywheel mechanism 5. An arm in the form of a circular shaft 78 rigid with and normal to the lever 76 projects from the lever 76 into the chamber 56 through a seal 79, and the arm 78 is adapted to pivot about a transverse pivot pin 80 which lies on a chord displaced from the axis of the shaft 78 in a direction towards the flywheel mechanism 5. The pivot pin 80 is fast in the housing 4 and is disposed on the opposite, outer side, of the seal 79 from the chamber 56.

The dump valve 8 comprises a valve member 81 engagable with a seating 82 surrounding the outer end of a longitudinal passage 83 which communicates at its opposite inner end with the passage 67. The valve member 81 comprises a piston guided to slide in a bore between the chamber 56 and the passage 83, and a head 91 at the free end of a portion 92 of reduced diameter is engagable with the seating 82. A passage 93 ensures that the portion 92 is at all times subjected to the pressure in the chamber 56. Thus the valve member 81 is urged towards the seating 82 by the pressure in the chamber 56 acting over a net effective area on the piston.

A spring 84 acting on the end of the lever 76 remote from the flywheel mechanism 5 urges the lever 76 angularly about the axis 80 so that the arm 79, in turn, urges the valve member 81 against the seating 82 to close the dump valve 8. In this position the isolating valve 10 is held open with the arm 78 acting through a push-rod 85 to urge a head 86 carried by the push-rod 85 away from a seating 87 surrounding the outer end of the bore 54 in the spool 50 against the load in a spring 88, and an adjuster screw 89 at the opposite end of the lever 76 is spaced from a conical outer end 90 of the clutch member 25.

The modulator assembly 3 is illustrated in a normal "brakes-off" inoperative position, with the variable orifice defined by the recess 57 in a position of maximum flow.

When the master cylinder 1 is operated to apply the brake 2, fluid under pressure flows to the brake 2 through the flow-control regulator 9, and the open isolating valve 10, with flow in the opposite direction from the through-bore 54 restricted by the orifice 58. The pressure from the master cylinder 1 also acts upon the one-way outlet valve 48 in a closing direction, on the dump valve 8 through the passage 59, and on the inner end of the time delay piston 11, which is of smaller area. This fluid pressure also acts on the inner end of the arm or shaft 78. Because the pivot pin 80 is deliberately offset from the axis of the shaft 78, the force resulting from this applies a turning moment to load the lever 76 in a counterclockwise direction in turn loading the dump valve 8 further in a closing direction, with the valve member 81 acting as an abutment for the lever 76.

Under such conditions the shaft 14 rotates freely with the plunger 32 urged out of co-operation with the eccentric 34 by means of the spring 35. The flywheel assembly 5 rotates with the shaft 14, being driven by the clutch 20, and the flywheel 12 and the reaction member 19 both rotate together due to the location of the balls 22 in the recesses 23 and 24. The flywheel mechanism 5 runs clear of the lever 76 by a small amount determined by a clearance between the adjuster screw 89 and the clutch member 25.

Normal decelerations of the braked wheel will not cause the flywheel 12 to generate a torque sufficient to overcome the force in the spring 29. However, should the braked wheel pass onto a slippery surface, the braked wheel will decelerate rapidly accompanied by a similar deceleration of the shaft 14 and the reaction member 19. Due to its inertia the flywheel 12 will continue to rotate at a greater speed, and the torque thus generated causes the balls 22 to ride up the ramps defined by the recesses 23 and 24, overcoming the load in the spring 29 and the pressure bias on the shaft 78, and with the relative angular movement of the flywheel 12 and the reaction member 19 being accompanied by axial movement of the reaction member 19 away from the flywheel 12. At the extent of the movement of the balls 22 up the ramps, the flywheel 12 and the reaction member 19 are in an expanded condition and both overrun relative to the shaft 14 with the clutch 20 slipping. Expansion of the flywheel mechanism 5 applies a force to the lever 76, causing it to pivot about the pin 80 as a fulcrum. This action first permits the isolating valve 10 to close and then opens the dump valve 8 subsequently. This is achieved by providing a degree of lost-motion between the arm 78 and the valve member 81 which is only taken up after the head 86 has engaged with the seating 87.

Closure of the isolating valve 10 restricts communication between the master cylinder 1 and the brake 2 through the passage 47 and the variable orifice, and opening the dump valve 8 reduces the pressure applied to the brake 2 by returning fluid from the brake 2 to the expander chamber or reservoir 39 through the passage 59, the chamber 56, and the passages 93, 83 and 67. This, in turn, urges the expander piston 40 relatively towards the cam 34. Also closure of the isolating valve 10 causes the spool 50 to move relatively towards the time delay piston 11 until flow through the variable orifice is almost cut-off. Fluid now flows from the master cylinder 1 to the brake 2 through the flow-control regulator valve 9 at a rate relative to the pressure difference between opposite ends of the spool 50, and the size of the fixed orifice 58. This pressure difference is determined by the area of the spool 50, and the magnitude of the spring forces acting upon it.

As the expander piston 40 moves towards the cam 34, the force in the spring 43 overcomes the force in the spring 35 and loads the plunger 32 into engagement with the cam 34. Thereafter the plunger 32 oscillates to draw fluid from the expander chamber or reservoir 39 and pump it into the pumping chamber 46. The inlet to the pumping chamber 46 is restricted by a small annulus above the seal 44, acting as the inlet valve, and this provides a steady output for the pump 6 at vehicle speeds greater than 10 kph.

When the speed of the flywheel 12 recovers at the termination of the skid following brake release, the shaft 14 accelerates and on reaching the speed of the flywheel 12, the axial force applied to the reaction member 19 by the spring 30 is operative to contract the flywheel mechanism 5, with the balls 22 running down the ramps, and the reaction member 19 moving both axially and angularly with respect to the flywheel 20. This movement of the reaction member 19 is accompanied by a corresponding movement of the lever 76 about the pivot pin 80 to permit the dump valve 81 to close, signifying the termination of the skid signal. The brake 2 is thereafter re-applied by the flow of fluid from the pump chamber 46, but at a rate determined by the flow-control regulator valve 9. Since the spool 50 is in a "down" position with the seat 87 in an equivalent position, the isolating valve 10 cannot re-open. The flow-control regulator valve 9 remains in the metering mode at which restricted rate the pressure applied to the brake through the bore 54 and the passages 55 and 59 is increased.

As the pressure applied to the brake 2 rises, second or subsequent skid signals may be emitted whereafter the sequence described above is repeated. During such second or subsequent skid signals the isolating valve 10 remains closed.

Should no further skid signals be received, the output from the pump 6 is progressively limited by movement of the expander piston 40 relatively away from the cam 34, and when the pressure applied to the brake 2 is substantially equal to the inlet pressure, the spool 50 returns to its original, initial, position with the isolating valve 10 open.

The output from the pump 6 is matched to the flow to the brake 2 through the flow-control regulator valve 9. This means that during brake release and recovery of fluid dumped to the expander chamber or reservoir 39, the flow from and to the master cylinder 1 is substantially constant and the driver will not feel an adverse effect on the brake pedal. At vehicle road speeds below, say 10 kph, the flywheel mechanism 5 has insufficient energy to actuate the dump valve 8 against the force in the spring 30 and the force of the pressure in the chamber 56. Should a skid signal be received at, say, 11 kph, the foot pedal travel may increase slightly due to the difference between the flow through the flow-control regulator valve 9 and the output from the pump 6.

When the pressure from the master cylinder 1 is removed at the end of a braking cycle, the spring 35 forces the plunger 32 away from the cam 34 and the expander piston 40 expels fluid from the expander chamber or reservoir 39 into the passage 47.

Ensuring that the pivot pin 80 is offset from the axis of the shaft 78 in a direction towards the flywheel mechanism 5 applies a moment to the lever 76 in a counterclockwise direction proportional to brake pressure, namely the pressure force applied to the arm or shaft 78. This means that on a good road surface, with the brake pressure high, the flywheel mechanism must generate a relatively higher torque before the dump valve 8 will open. Similarly, for surfaces of lower friction, the pressure force is correspondingly lower and thus the threshold of the flywheel mechanism 5 is proportionally lower.

When the pressure applied to the brake 2 is released by operation of the dump valve 8, the force on the flywheel mechanism 5 also decreases so that the clutch 20 is loaded only by the springs 30 and 84 whilst it "runs-on" against the clutch 20 to provide an improved speed reference.

Should the dump valve 8 remain in its open position for more than a predetermined time because of, for example, a failure of the ball and ramp mechanism in the flywheel mechanism 5, then the pressure in the chamber 61 will tend to equalise, through the orifice 65, with the pressure in the expander chamber 39 which is equal to the pressure applied to the brake 2. Since substantially equal pressures will then be applied to opposite ends of the stepped, time-delay, piston 11, the piston 11 will move slowly towards the flow-control regulator valve 9 against the force in the spring 72. Whilst this is happening, the pump 6 will still be pumping fluid back to the master cylinder 1 at substantially the rate at which fluid is flowing to the brake 2 through the flow-control regulator valve 9. However when the piston 11 loads the spring 72 against the spool 50, the spring 72 therefore exerts a greater force upon the spool 50. This has the effect of ensuring that the fluid flows into the brake 2 faster than it can be pumped out. Thus the brake 2 is re-applied, but at a controlled rate.

For normal operation the pressure applied to the brake 2 is higher than the pressure in the expander chamber 39. Since the lower pressure is applied through the orifice 65 to the end of the piston 11 which is of greater area, the higher pressure acts on the end of the piston 11 which is of smaller area to hold the piston 11 down against its abutment with the closed outer end of the bore 61.

Should a failure of the drive from the wheel to the shaft 14 occur after the dump valve 8 has opened, the brakes will automatically be re-applied by the flow-control regulator valve 9. In such a case the travel of the foot pedal will increase to compensate for the fluid dumped into the expander chamber 39. All subsequent brake-applying operations will be normal, but there will not be any anti-lock protection until the drive to the shaft 14 is repaired.

I claim:

1. Skid sensing means for vehicle hydraulic anti-skid braking systems comprising a brake for a wheel on a vehicle, a source of fluid under pressure for applying said brake hydraulically, a shaft driven from said wheel to be braked by said brake, a housing having a fluid chamber and a fluid-tight seal sealing said fluid chamber from atmosphere, a dump valve for relieving pressure applied to said brake and movable between an open position and a closed position, said dump valve being disposed within said fluid chamber, a flywheel assembly in said housing mounted on said shaft, a clutch through which said flywheel assembly is driven from said shaft, said flywheel assembly comprising a flywheel member, a reaction member, and a ball and ramp mechanism co-operating with said two members and so constructed and arranged that relative angular movement between said members which occurs when the deceleration of said braked wheel exceeds a predetermined value is accompanied by relative axial movement therebetween into an expanded condition in order to open said dump valve to relieve said pressure applied to said brake, said clutch being arranged to slip at a predetermined threshold torque so that said two members can continue to rotate together or "overrun", in said expanded condition with respect to said shaft to maintain said dump valve in said open condition, at least until said wheel has recovered a predetermined rotational speed, wherein said dump valve comprises a valve seating, and a valve member for engagement with said seating, and said flywheel assembly acts on said valve member through a lever assembly comprising a single member, a fixed pivot in said housing and about which said member is angularly movable in response to relative axial movement between said members of said flywheel assembly, and said single member is constituted by an elongate lever, and an arm rigid with said lever, said lever having a force receiving part spaced from said pivot and with which said flywheel co-operates, and said arm having a force transmitting part spaced from said lever and which projects into said fluid chamber in said housing through said fluid-tight seal and acts to co-operate directly with said valve member of said dump valve to urge said member away from said seating against a force due to fluid brake-pressure in said fluid chamber which acts normally to urge said valve member into engagement with said seating in said closed position of said dump valve.

2. Skid sensing means as claimed in claim 1, wherein a spring acts to urge said arm in a direction to bias said valve member into engagement with said seating.

3. Skid sensing means as claimed in claim 1, wherein said arm has an inner end having a pressure-responsive face and projecting into said fluid chamber, said pressure-responsive face being responsive to pressure in said fluid chamber, and said fixed pivot is so positioned that said pressure acting on said pressure-responsive face applies a turning moment to said lever assembly to move it in such a direction as to urge said valve member into engagement with said seating.

4. Skid sensing means as claimed in claim 1, wherein the arm has a generally cylindrical portion which extends through said seal, and said fixed pivot comprises a transverse pivot pin which pivotally connects said cylindrical portion to the housing and of which the axis is spaced from the longitudinal axis of the cylindrical portion to the side remote from said dump valve.

5. Skid sensing means as claimed in claim 2, wherein said lever is pivotally connected to the housing at an intermediate point in the length thereof, and said spring acts on one end of said lever to urge the opposite end of said lever towards said flywheel assembly.

6. Skid sensing means as claimed in claim 1, wherein said lever assembly is also adapted to operate an isolating valve between said source of fluid under pressure and said brake.

7. Skid sensing means as claimed in claim 6, wherein said arm acts normally to hold said isolating valve in an open position when said dump valve is in said closed position, and a lost-motion connection is provided between said arm and said valve member of said dump valve to ensure that said dump valve cannot be opened before said isolating valve is closed.

8. Skid sensing means as claimed in claim 7, wherein a flow-control regulator valve comprises a bore, and a spool working in said bore and provided with a longitudinal passage, and said isolating valve comprises a head at one of a stem which projects through said longitudinal passage in said spool and the opposite end of said stem is engageable with said arm, said head normally being spaced from a seating on said spool against the force in a return spring.

* * * * *